United States Patent
Kamiki

(10) Patent No.: US 8,344,563 B2
(45) Date of Patent: Jan. 1, 2013

(54) ROTATING ELECTRICAL MACHINE HAVING FANS ON FRAME

(75) Inventor: Yasuaki Kamiki, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 140 days.

(21) Appl. No.: 12/959,391

(22) Filed: Dec. 3, 2010

(65) Prior Publication Data

US 2011/0227432 A1  Sep. 22, 2011

(30) Foreign Application Priority Data

Mar. 16, 2010  (JP) ................. 2010-059771

(51) Int. Cl.
*H02K 9/00* (2006.01)
*H02K 5/20* (2006.01)

(52) U.S. Cl. .............. 310/58; 310/52; 310/59; 310/60 A

(58) Field of Classification Search .................... 310/58, 310/59, 60 A; *H02K 9/00, 5/20*
See application file for complete search history.

(56) References Cited

U.S. PATENT DOCUMENTS

| | | | | |
|---|---|---|---|---|
| 4,702,154 | A | * | 10/1987 | Dodson .................. 454/184 |
| 6,333,851 | B1 | * | 12/2001 | Shih ....................... 361/695 |
| 6,538,351 | B2 | * | 3/2003 | Semba et al. ............ 310/52 |
| 6,561,336 | B1 | * | 5/2003 | Huart et al. ............ 192/70.252 |
| 2008/0030108 | A1 | * | 2/2008 | Trago et al. ............ 310/49 R |
| 2009/0051239 | A1 | * | 2/2009 | Kinoshita et al. ....... 310/152 |

FOREIGN PATENT DOCUMENTS

| | | |
|---|---|---|
| JP | 58-156358 U | 10/1983 |
| JP | 04133641 | * 5/1992 |
| JP | 06-311691 | 11/1994 |
| JP | 2002-281721 | 9/2002 |
| JP | 2004-229405 | 8/2004 |

OTHER PUBLICATIONS

Japanese Office Action for corresponding JP Application No. 2010-059771, Jun. 8, 2012.

\* cited by examiner

*Primary Examiner* — Quyen Leung
*Assistant Examiner* — Terrance Kenerly
(74) *Attorney, Agent, or Firm* — Ditthavong Mori & Steiner, P.C.

(57) ABSTRACT

A rotating electrical machine includes a flange provided at one end of a substantially rectangular, hollow frame in an axial direction; a lid provided at the other end of the frame in the axial direction; a rotor including a shaft, the shaft being rotatably supported by the flange and the lid; a stator fixed to an inner section of the frame, the stator surrounding the rotor; and a plurality of fans provided on opposite side surfaces of the frame in a plan view of the frame as viewed in the axial direction.

10 Claims, 5 Drawing Sheets

US 8,344,563 B2

ROTATING ELECTRICAL MACHINE HAVING FANS ON FRAME

CROSS-REFERENCE TO RELATED APPLICATION

The present application claims priority under 35 U.S.C. §119 to Japanese Patent Application No. 2010-059771, filed Mar. 16, 2010. The contents of the application are incorporated herein by reference in their entirety.

BACKGROUND OF THE INVENTION

1. Field of the Invention

The present invention relates to rotating electrical machines.

2. Discussion of the Background

Japanese Unexamined Patent Application Publication No. 2002-281721 discloses a rotating electrical machine suitable for use as a large-capacity rotating electrical machine. The rotating electrical machine has a combination of the number of poles and the number of coils suitable for using the rotating electrical machine as a permanent magnet synchronous motor. Accordingly, an induced voltage waveform is close to a sine wave, and the amplitude of a cogging torque is reduced so that the required skew angle can be reduced. Therefore, even when the capacity of the rotating electrical machine is increased, the influence of unbalanced attractive force is small.

SUMMARY OF THE INVENTION

According to one aspect of the present invention, a rotating electrical machine includes a flange provided at one end of a substantially rectangular, hollow frame in an axial direction; a lid provided at the other end of the frame in the axial direction; a rotor including a shaft, the shaft being rotatably supported by the flange and the lid; a stator fixed to an inner section of the frame, the stator surrounding the rotor; and a plurality of fans provided on opposite side surfaces of the frame in a plan view of the frame as viewed in the axial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
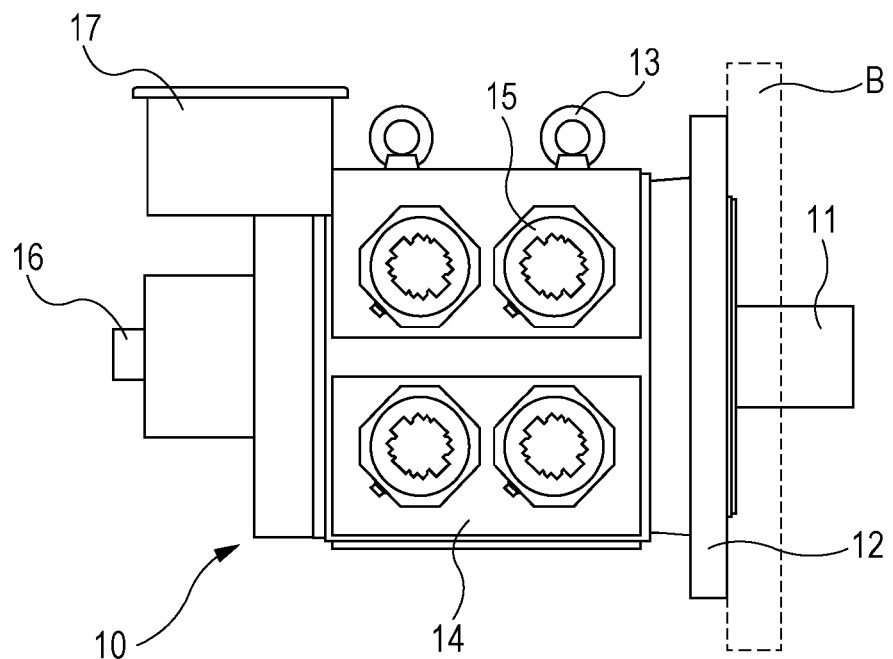
FIG. 1 is a side view of a rotating electrical machine.

The external structure of a rotating electrical machine 10 according to an embodiment of the present invention will be described with reference to FIGS. 1 and 3. FIG. 1 is a side view of the rotating electrical machine 10, FIG. 2 is a front view of the rotating electrical machine 10, and FIG. 3 is a top view of the rotating electrical machine 10.

Figure 2:
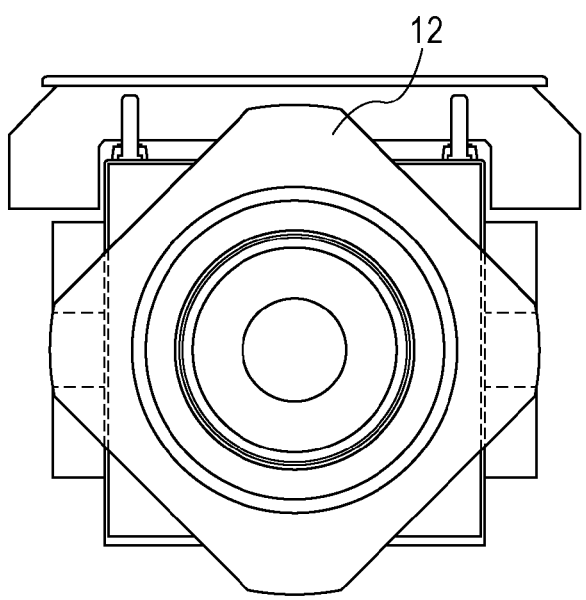
FIG. 2 is a front view of the rotating electrical machine.
Figure 3:
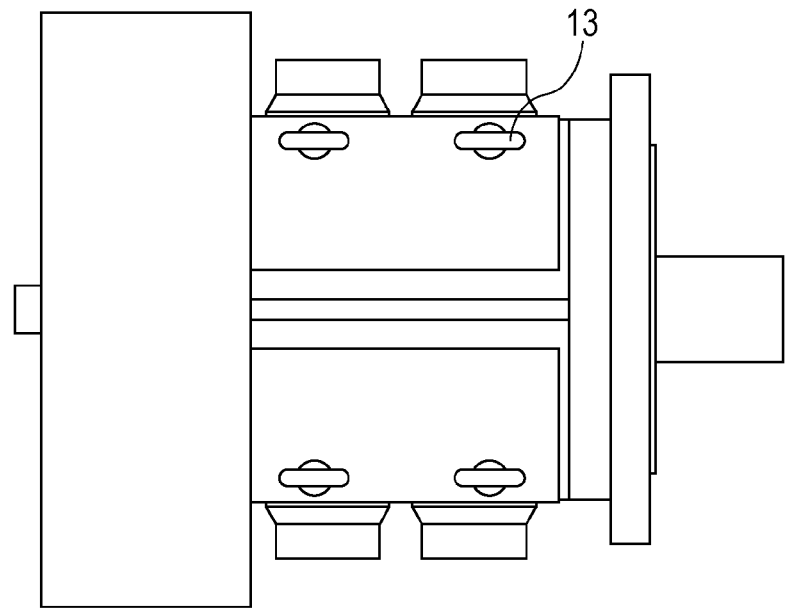
FIG. 3 is a top view of the rotating electrical machine.

Referring to FIGS. 1 to 3, the rotating electrical machine 10 is a large motor having an extremely high output. The rotating electrical machine 10 is fixed with bolts (not shown) to a bracket B with a plate-shaped flange unit 12 provided therebetween. The rotating electrical machine 10 is fixed such that a shaft 11 extends horizontally. Four rings 13 for suspending the rotating electrical machine 10 with a crane are provided at the top of the rotating electrical machine 10. A surface of the rotating electrical machine 10 is covered by a cover 14, and four cooling fans 15 are provided at each side of the rotating electrical machine 10. An encoder unit 16 that controls the position and speed of the motor is provided at the back of the rotating electrical machine 10. A connector unit 17 through which power is supplied is provided above the encoder unit 16.

The fans 15 are provided at the opposite sides of the rotating electrical machine 10 so as to face each other in a plan view of the rotating electrical machine 10 as viewed in an axial direction of the shaft 11. Internal Structure of Rotating Electrical Machine 10

Figure 4:
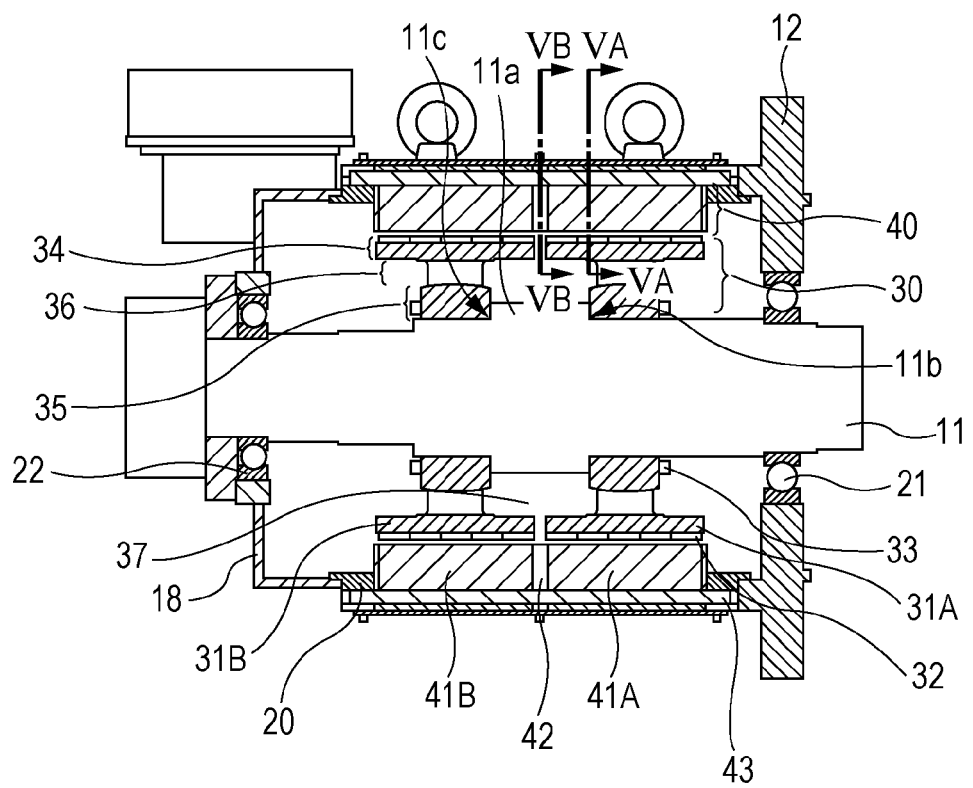
FIG. 4 is a side sectional view of the rotating electrical machine.

The internal structure of the rotating electrical machine 10 will now be described with reference to FIG. 4. FIG. 4 is a side sectional view of the rotating electrical machine 10. The shaft 11 is provided so as to extend through a rotating shaft of the rotating electrical machine 10 in the axial direction. The rotating electrical machine 10 includes the flange unit 12 at one end of a substantially rectangular, hollow frame 20 in the axial direction. The rotating electrical machine 10 also includes a lid unit 18 at the other end of the frame 20 in the axial direction. The shaft 11 is rotatably supported by bearings 21 and 22 provided on the flange unit 12 and the lid unit 18, respectively.

Structure of Rotor Unit 30

A rotor unit 30 is fixed to the shaft 11. The rotor unit 30 rotates together with the shaft 11. The rotor unit 30 includes a first rotor core 31A and a second rotor core 31B. The first rotor core 31A and the second rotor core 31B are arranged next to each other in the axial direction. Magnets 32 are provided on the outer peripheral surfaces of the first rotor core 31A and the second rotor core 31B. The magnets 32 are permanent magnets. The shaft 11 has a shape including step portions having different outer diameters. A rotor-core attachment portion 11a is provided at a central section of the shaft 11 in the axial direction, where the outer diameter of the shaft 11 is the largest. The rotor cores 31A and 31B are fixed with bolts 33 to rotor-core attachment surfaces 11b and 11c, respectively, which are side surfaces of the rotor-core attachment portion 11a in the axial direction. The method for fixing the rotor cores 31A and 31B is not particularly limited, and the rotor cores 31A and 31B may instead be fixed using keys, spannrings, or the like.

The rotor cores 31A and 31B include rotor-core outer peripheral portions 34 to which the magnets 32 are attached, rotor-core inner peripheral portions 35 at which the rotor cores 31A and 31B are attached to the rotor-core attachment portion 11a, and rotor-core central portions 36 that connect the rotor-core outer peripheral portions 34 to the rotor-core inner peripheral portions 35. The rotor-core outer peripheral portions 34 are shaped so as to protrude from both sides of the rotor-core central portions 36 in the axial direction. Thus, the first rotor core 31A and the second rotor core 31B have recesses formed in the axial direction.

The rotor unit 30 is provided with a rotor-core space 37 that is defined mainly by the rotor-core outer peripheral portions 34, the rotor-core central portions 36, and the rotor-core attachment portion 11a. In other words, the rotor unit 30 is provided with the rotor-core space 37 defined by the recesses that are formed in the first rotor core 31A and the second rotor core 31B and that face each other. Owing to the rotor-core space 37, the weight of the rotor unit 30 is reduced. Therefore, the inertia of the rotor unit 30 is reduced and the efficiency of the motor is increased. With the above-described structure, a rotating electrical machine having a light structure suitable for increasing the size thereof in accordance with the increasing capacity can be provided.

Structure of Stator Unit 40

A stator unit 40 is provided so as to surround the rotor unit 30 with an air gap therebetween at the outer periphery of the rotor unit 30. The stator unit 40 includes a first stator core 41A and a second stator core 41B. The first stator core 41A and the second stator core 41B are arranged next to each other in the axial direction. The first stator core 41A and the second stator core 41B are fixed to an inner section of the frame 20.

A reinforcing plate 42 made of metal, such as steel or stainless steel, is provided between the first stator core 41A and the second stator core 41B so as to extend substantially parallel to the flange unit 12. With this structure, a rotating electrical machine having a high-rigidity structure suitable for increasing the size thereof in accordance with the increasing capacity can be provided.

The first stator core 41A, the second stator core 41B, and the reinforcing plate 42 are positioned with respect to each other by a pin 43 inserted therethrough, and are fixed to the frame 20. Thus, the rigidity of the stator unit 40 is increased.

The pin 43 is a single component, and extends through the first stator core 41A, the reinforcing plate 42, and the second stator core 41B from one end of the frame 20 to the other end of the frame 20 in the axial direction. Thus, the rigidity of the stator unit 40 is further increased.

Description of Detailed Shape of Reinforcing Plate

Figure 5A:
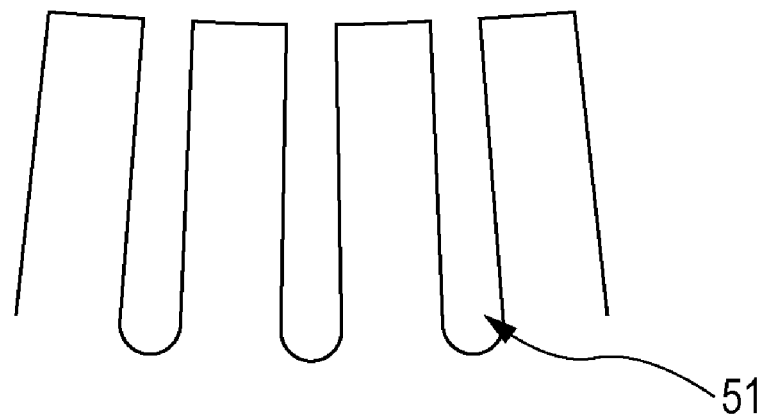
FIGS. 5A and 5B are sectional views of parts of a stator unit.
Figure 5B:
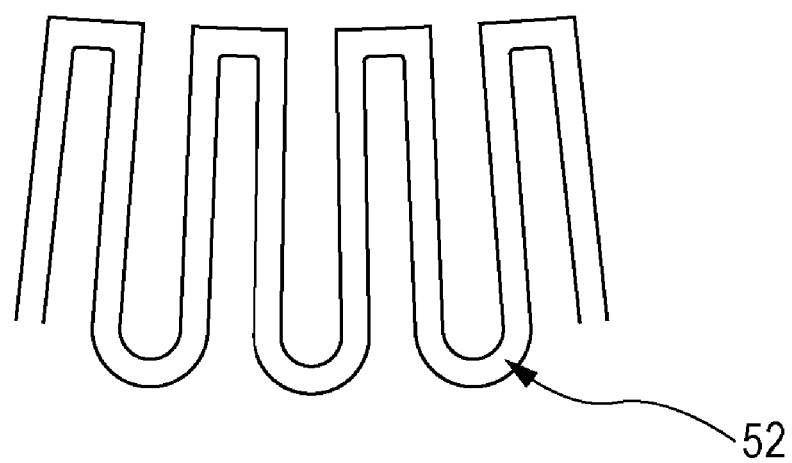

The detailed shape of the reinforcing plate 42 will now be described with reference to FIGS. 5A and 5B. FIGS. 5A and 5B are sectional views of the stator unit 40, where FIG. 5A is a sectional view of FIG. 4 taken along line VA-VA and FIG. 5B is a sectional view of FIG. 4 taken along line VB-VB. As illustrated in FIG. 5A, the first stator core 41A includes a plurality of teeth 51, and coils (not shown) are wound around the teeth 51. In addition, as illustrated in FIG. 5B, the reinforcing plate 42 includes a plurality of tongue portions 52 that have slightly larger width and height than those of the teeth 51 around which the coils are wound. Accordingly, deformation of the teeth 51 can be prevented and the coils can be easily inserted. With the above-described structure, a rotating electrical machine that can be easily manufactured can be provided.

Description of Reinforcing Structure Including Reinforcing Bars

Figure 6:
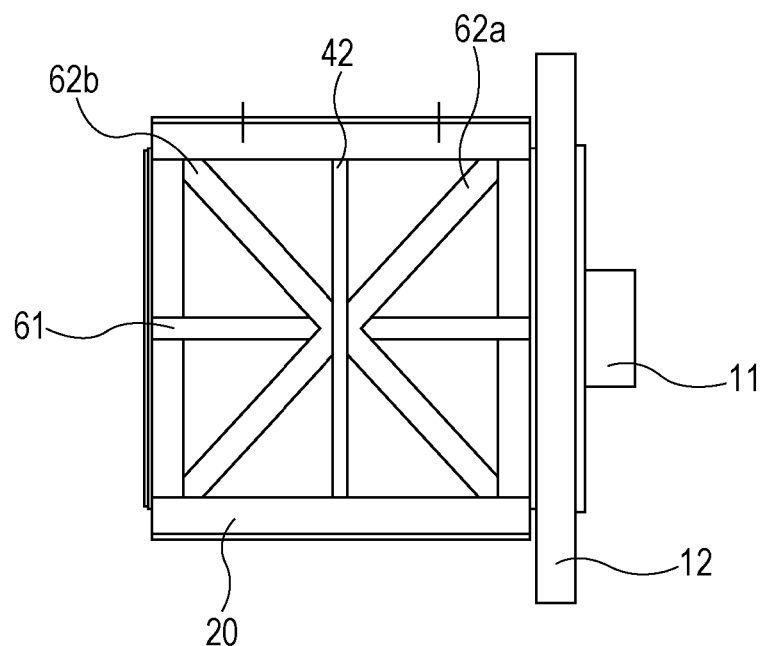
FIG. 6 is a side view of the rotating electrical machine in the state in which a cover is removed.

A reinforcing structure of the rotating electrical machine 10 including reinforcing bars will now be described with reference to FIG. 6. FIG. 6 is a side view of the rotating electrical machine 10 in the state in which the cover 14 is removed. The above-described reinforcing plate 42 is provided at a central section of the rotating electrical machine 10 in the axial direction. A reinforcing bar 61 is attached to the frame 20 at each of the opposite sides of the frame 20 in a plan view of the frame 20 as viewed in the axial direction of the shaft 11. The reinforcing bar 61 extends in a direction perpendicular to the reinforcing plate 42. In addition, reinforcing bars 62a and 62b are diagonally attached to the frame 20 in an inclined manner so as to intersect each other.

With this structure, a rotating electrical machine having a high-rigidity structure suitable for increasing the size thereof in accordance with the increasing capacity can be provided. More specifically, since the reinforcing structure including the above-described reinforcing bars is used, the frame 20 is strongly reinforced. As a result, even when the rotating electrical machine 10 is a motor having extremely large size and capacity, the rotating electrical machine 10 can be supported in a cantilever manner by fixing the flange unit 12 to the bracket B in a state such that the shaft 11 is substantially horizontal.

Cooling Operation Using Fans

Figure 7:
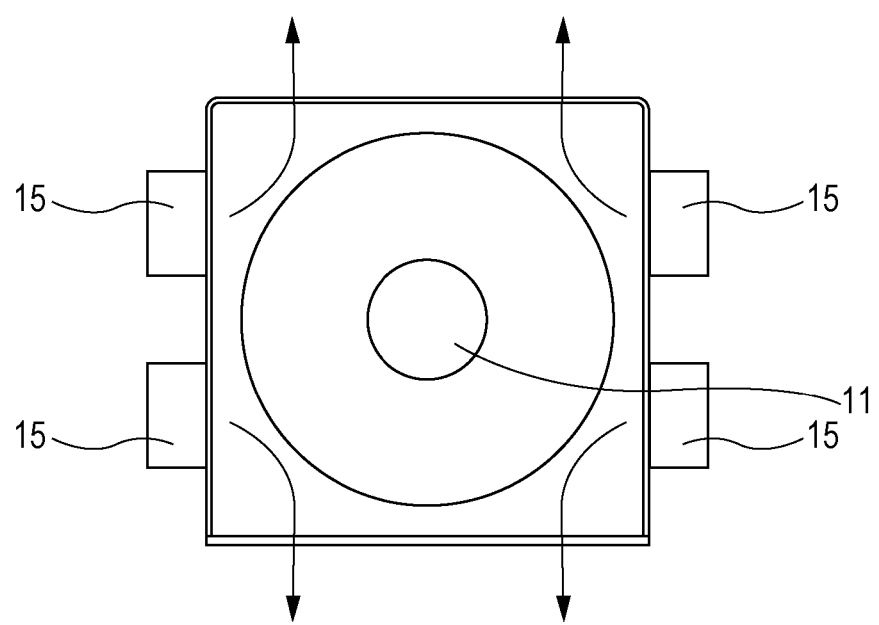
FIG. 7 is a schematic diagram illustrating a cooling operation performed by fans.

Next, a cooling operation using the fans 15 will be described with reference to FIG. 7. FIG. 7 is a schematic diagram illustrating the cooling operation performed by the fans 15. As illustrated in FIG. 7, rotation directions of the fans 15 are set such that air blows into the rotating electrical machine 10. The fans 15 are disposed symmetrically to each other with respect to the axial line of the rotor unit 30. The air from the fans 15 at an upper section (at one side of the axial line) hits the stator unit 40 and absorbs heat from the stator unit 40. Then, the air is reflected by the stator unit 40 and is discharged from the top of the rotating electrical machine 10. The air from the fans 15 at a lower section (at the other side of the axial line) hits the stator unit 40 and absorbs heat from the stator unit 40. Then, the air is reflected by the stator unit 40 and is discharged from the bottom of the rotating electrical machine 10. The rotating electrical machine 10 is fixed to the bracket B in a cantilever manner with the flange unit 12 provided therebetween, and no obstacle is placed above or below the rotating electrical machine 10. Therefore, the cooling air that hits the stator unit 40 smoothly flows out of the rotating electrical machine 10. Therefore, the rotating electrical machine 10 with an extremely high output that generates high-temperature heat can be effectively cooled. With this structure, a rotating electrical machine having a structure for effectively dissipating the generated heat that increases with the increasing capacity can be provided.

The fans 15 are fixed to the frame 20 or the reinforcing bars 62a and 62b. In the case where the fans 15 are provided on the reinforcing bars 62a and 62b, the air from the fans 15 hits the reinforcing bars 62a and 62b and is diffused, so that the cooling efficiency can be increased.

As described above, the rotating electrical machine 10 according to the present embodiment includes the reinforcing plate 42 and the reinforcing bars 62a and 62b in the frame unit, so that the rotating electrical machine 10 can be supported in a cantilever manner using the flange unit. In addition, the cooling effect can be further increased by placing the fans 15 at appropriate positions. In the case where the fans 15 are provided on the side surfaces of the frame 20, the fans 15 function as reinforcing members for reinforcing the side surfaces of the frame 20. Therefore, the rigidity of the frame 20 can be further increased.

An embodiment of the present invention has been described above. However, it is apparent to those skilled in the art that various alterations can be made to the embodiment, and such alterations are also within the technical scope of the present invention.

Description of Rotor Skew

Figure 8A:
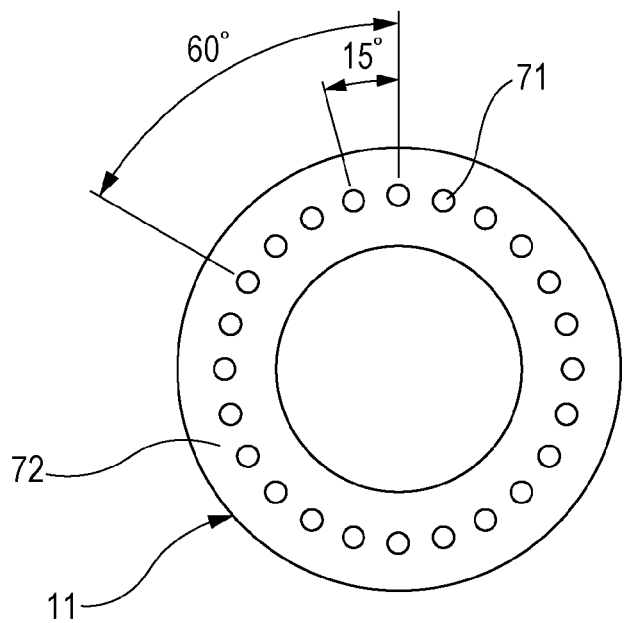
FIGS. 8A and 8B are schematic diagrams illustrating skewing of a rotor unit.
Figure 8B:
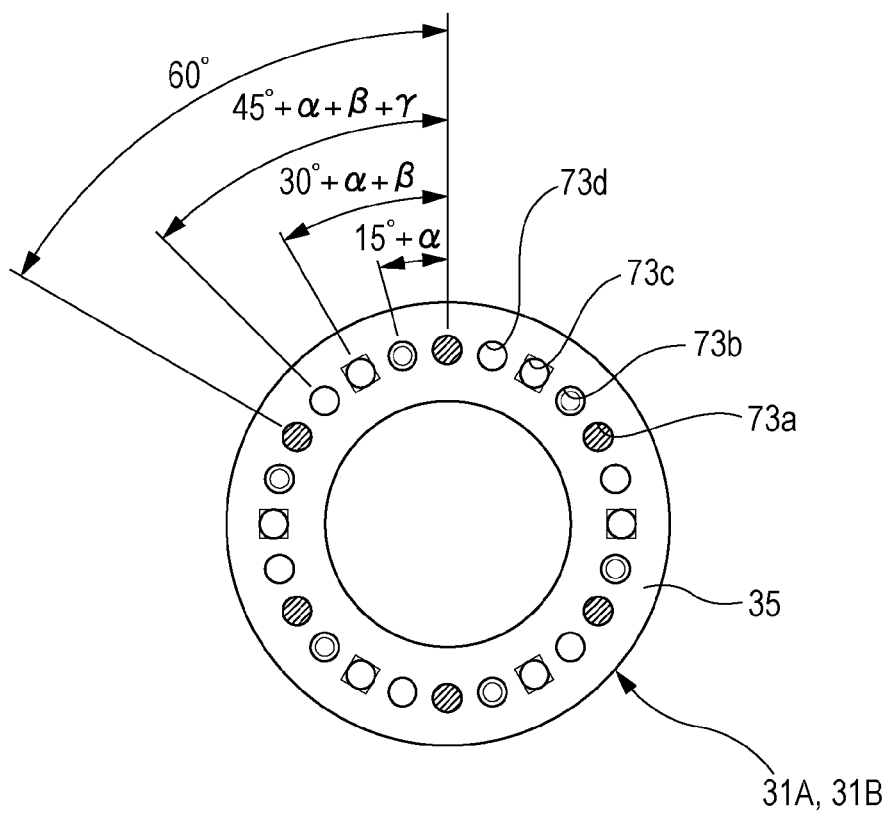

For example, in the above-described embodiment, the rotor unit 30 is not skewed. However, the rotor unit 30 may be skewed. Skewing of the rotor unit 30 will now be described with reference to FIGS. 8A and 8B. FIGS. 8A and 8B are schematic diagrams illustrating skewing of the rotor unit 30. FIG. 8A illustrates a rotor-core attachment surface 72, and FIG. 8B illustrates a rotor-core inner peripheral portion 35. The rotor-core attachment surface 72 is either of the rotor-core attachment surfaces 11b and 11c, and has internal thread portions 71 formed therein. The internal thread portions 71 are arranged along a circumference at a constant pitch (at 24 positions in FIG. 8A). Bolt insertion holes (first holes 73a), the number of which corresponds to the number of bolts necessary for providing torque resistance, are formed in the rotor-core inner peripheral portion 35. The first holes 73a are arranged along a circumference at a constant pitch (at 6 positions in FIG. 8B). Additional bolt insertion holes (second holes 73b, third holes 73c, and fourth holes 73d), the number of which corresponds to the number of bolts necessary for providing torque resistance, are also formed in the rotor-core inner peripheral portion 35. The second holes 73b, the third holes 73c, and the fourth holes 73d are arranged at a constant pitch at positions shifted from the first holes 73a by predetermined angles ($\alpha$, $\beta$, and $\gamma$). With this structure, the rotor unit 30 can be skewed with relatively large freedom. In the case where each of the first rotor core 31A and the second rotor core 31B has the above-described structure, the rotor unit 30 can be skewed at an angle other than the predetermined angles ($\alpha$, $\beta$, $\gamma$), for example, at ($\alpha-\beta$) or ($\alpha+\beta$). When the rotor unit 30 is skewed, cogging thrust can be reduced and smooth control can be achieved.

In the above-described embodiment, the fans 15 are attached to the cover 14 or the frame 20. However, the fans 15 may instead be attached to the inclined reinforcing bars 62a and 62b. In such a case, the fans 15 function as structural components and the rigidity of the frame 20 can be increased. In addition, when the inclined reinforcing bars 62a and 62b are positioned at the centers of the fans 15, the cooling air is evenly divided so as to flow along both sides of each of the reinforcing bars 62a and 62b. Therefore, the reinforcing efficiency can be further increased.

The rotating electrical machine 10 is not limited to a motor, and may instead be a generator.

In addition to the above-described examples, methods of the above-described embodiment and modifications may be used in combination as appropriate.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A rotating electrical machine comprising:
   a rotor having a rotational axis;
   a frame having a hollow shape and including a first end and a second end opposite to the first end in an axial direction along the rotational axis, the frame including a first outer flat surface and a second outer flat surface, the first outer flat surface being provided along the axial direction, the second outer flat surface being provided along the axial direction and being opposite to the first outer flat surface with respect to the rotational axis when viewed from the axial direction;
   a flange provided at the first end of the frame;
   a lid provided at the second end of the frame, the flange and the lid supporting the rotor to be rotatable with respect to the frame about the rotational axis;
   a stator connected to an inner section of the frame and surrounding the rotor;
   a first fan provided on the first outer flat surface of the frame to blow air into the frame, the first fan being offset toward a first side with respect to the rotational axis in a first direction along the first and second outer flat surfaces when viewed from the axial direction; and
   a second fan provided on the second outer flat surface of the frame to blow air into the frame, the second fan being offset toward a second side with respect to the rotational axis in the first direction when viewed from the axial direction, the second side being opposite to the first side with respect to the rotational axis in the first direction when viewed from the axial direction.

2. The rotating electrical machine according to claim 1, wherein the first and second fans are disposed symmetrically to each other with respect to the rotational axis when viewed from the axial direction.

3. The rotating electrical machine according to claim 1, further comprising:
   a third fan provided on the first outer flat surface of the frame to blow air into the frame, the third fan being offset toward the second side with respect to the rotational axis in the first direction when viewed from the axial direction.

4. The rotating electrical machine according to claim 3, further comprising:
   a fourth fan provided on the second outer flat surface of the frame to blow air into the frame, the fourth fan being offset toward the first side with respect to the rotational axis in the first direction when viewed from the axial direction.

5. The rotating electrical machine according to claim 4, wherein the third and fourth fans are disposed symmetrically to each other with respect to the rotational axis when viewed from the axial direction.

6. The rotating electrical machine according to claim 4, wherein the first fan is opposite to the fourth fan in a second direction perpendicular to the first direction when viewed from the axial direction, and
   wherein the second fan is opposite to the third fan in the second direction when viewed from the axial direction.

7. The rotating electrical machine according to claim 4, wherein the first fan is spaced apart from the third fan along the first outer flat surface when viewed from the axial direction, and
   wherein the second fan is spaced apart from the fourth fan along the second outer flat surface when viewed from the axial direction.

8. The rotating electrical machine according to claim 1, wherein the first and second outer flat surfaces are disposed symmetrically to each other with respect to the rotational axis when viewed from the axial direction.

9. The rotating electrical machine according to claim 1, further comprising:
   a first reinforcing bar connected to the frame to reinforce the frame; and
   a second reinforcing bar connected to the frame to reinforce the frame,
   wherein the first fan is provided to blow air toward the first reinforcing bar, and
   wherein the second fan is provided to blow air toward the second reinforcing bar.

10. The rotating electrical machine according to claim 1, wherein the stator includes a first stator portion and a second stator portion,
    wherein the first stator portion is provided on the first side with respect to the rotational axis in the first direction,
    wherein the second stator portion is provided on the second side with respect to the rotational axis in the first direction,
    wherein the first fan is provided to blow air to the first stator portion, and
    wherein the second fan is provided to blow air to the second stator portion.

* * * * *